8881X
J. Nicolet,
Anti-Friction Roller.
Patented June 12, 1835.
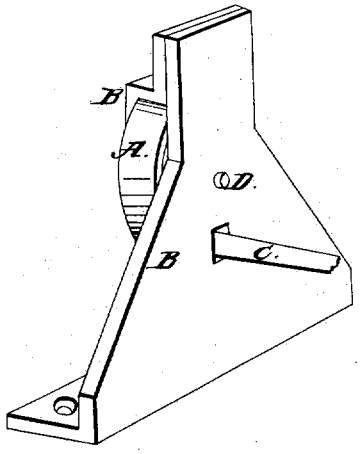
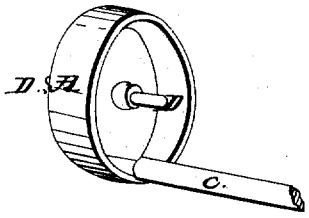
THE HELIOTYPE PRINTING CO. 220 DEVONSHIRE ST. BOSTON.

8881 X June 12, 1835

Julien Nicolet of Pittsburg Pennsylvania

Letters Patent

The schedule referred to in these Letters Patent and making part of
the same containing a description in the words of the said Julien
Nicolet himself of his improvement in machinery called the antifriction
wheels particularly applicable to Steam Boats.

To all to whom these presents shall come. Be it known that I
Julien Nicolet of the City of Pittsburg in the State of Pennsylvania -
have invented a new and useful improvement in machinery called
anti-friction wheels particularly applicable to Steam Boats. and that
the following is a full and exact description of the construction and op-
eration of the same. The friction wheels which I use are made of cast
iron or any other suitable material; in the form of a short hollow cylinder
with one end closed and the other open. or in other words of a fla
wheel with a narrow flange projecting at right angles from its cir-
cumference, the dimensions being varied to suit circumstances. At
the centre a square opening is left for the shaft which for strength is also
surrounded by a thick flange. The shaft on which the wheel is made -
permanent. and which should be of well tempered steel. passes through
the centre opening and projects sufficiently far on both sides, to form the jou
rnals or bearings of the wheel. Although the bearings may be varied; those
which I prefer are as follows; an upright plate of iron with a rectangular
foot or ear to secure it by screws, is made fast to the top of the bearing timbe
or a straight plate when that form will suit the situation best. is to be
used. in the upper end a hole is made for one journal of the friction whe
or a suitable box may be attached thereto. the other journal being suppor
ted in a similar hole or box. in the upper end of a short iron cap. or
rectangular arm. secured firmly to the back of the plate. just mention
ed. the wheel lying between them. with the cavity towards the plate.
A hole is made in the plate of sufficient size. to admit and allow
to play freely. the shaft of the balance wheel or other shaft. to be re-
lieved. of the friction. its lower side or end extending a short distance

[illegible]

8881 X below the flange of the friction wheel by which means the shaft is caused
to bear on the inner surface of the flange and the friction of the same
is relieved or diminished in the proportion which the diameter of the flange
bears to the diameter of the journal of the friction wheel and shaft joint
ly. On the end of the shaft a journal is turned as truly cylindrical as
possible. being well tempered, and something shorter than the depth
of the flange. the square shoulder of the shaft thus formed, prevents
the end of the journal from coming in contact with the plane of the
wheel. and the sides of the hole in the plate serve to check the lateral
movement of the shaft. to receive the pressure of which lateral friction roll
ers attached to the plate may be employed. These wheels I apply, one
at each end of the shaft of water wheels or balance wheels used for pro
pelling mills and factories. also to the paddle wheels and balance wheel of
Boats to be propelled by steam or other power and have found by a va-
riety of experiments. that their application effects an immense saving
of power and expense of machinery. and particularly when applied
to Steam Boats; of additional weight of machinery. and loss of life
consequent upon the employment of Engines. and Boilers far more power
ful than what would be required with my improvement.

Now I do not claim to have invented the friction wheel
described herein. but its application to the specific purposes herein
set forth. In testimony that the foregoing is a true specification
of my said improvement, I have hereunto set my hand at the City
of Washington this 30th day of May 1835.

Exd. Witnesses
[illegible] Sam Stettinius
James Tate

Julien Nicolet (784 words)

June 12 1835

(Drawing)